(12) United States Patent
Alkhaled

(10) Patent No.: US 9,025,694 B1
(45) Date of Patent: May 5, 2015

(54) (NX2)-CHANNEL BIT COMMUNICATION SYSTEM

(71) Applicant: Fahad S H Z Alkhaled, Alsalmeya (KW)

(72) Inventor: Fahad S H Z Alkhaled, Alsalmeya (KW)

( * ) Notice: Subject to any disclaimer, the term of this patent is extended or adjusted under 35 U.S.C. 154(b) by 36 days.

(21) Appl. No.: 14/078,552

(22) Filed: Nov. 13, 2013

(51) Int. Cl.
H04B 15/00 (2006.01)
H04L 25/08 (2006.01)

(52) U.S. Cl.
CPC ...................... H04L 25/08 (2013.01)

(58) Field of Classification Search
CPC .............. H04B 3/32; H04B 3/23; H04B 1/40; H04L 625/03343; H04L 25/497; H04L 25/03057; H04L 27/2601
USPC .......... 375/219–220, 257, 259, 285, 295, 316
See application file for complete search history.

(56) References Cited

U.S. PATENT DOCUMENTS

| | | | |
|---|---|---|---|
| 8,885,759 B1 * | 11/2014 | Alkhaled | 375/285 |
| 2001/0042216 A1 * | 11/2001 | Jung et al. | 713/300 |
| 2002/0027688 A1 * | 3/2002 | Stephenson | 359/152 |
| 2004/0005009 A1 * | 1/2004 | Taghizadeh-Kaschani | 375/259 |
| 2005/0134306 A1 * | 6/2005 | Stojanovic et al. | 326/31 |
| 2013/0188967 A1 | 7/2013 | Eiselt et al. | |

* cited by examiner

*Primary Examiner* — Khanh C Tran

(57) ABSTRACT

A bit communication system, with its' associated digital-hardware-implemented mechanisms for bit transmission, bit reception, and channel balancing; are presented, where electrical, photonic, or EM pulses, representing binary information bits, are carried from a transmitter point over a (N×2)-channel transmission medium, to a receiver point. The binary value of a transmitted pulse is identified at the receiver by means of the actual channel the pulse is travelling through. For example, if at a given time, any pulse transmitted and received through the first channel represents logic one, while any pulse transmitted and received through the second channel represents logic zero.

12 Claims, 6 Drawing Sheets

| State | Point A (Subscriber) | Point B (Central Office) | Switches at Point A | Switches at Point B | |
|---|---|---|---|---|---|
| 1a | Tx | Rx | S0=ON, S1=OFF | S0=S1=OFF | Bit 0 sent from Point A to Point B |
| 1b | Tx | Rx | S0=OFF, S1=ON | S0=S1=OFF | Bit 1 sent from Point A to Point B |
| 2a | Rx | Tx | S0=S1=OFF | S0=ON, S1=OFF | Bit 0 sent from Point B to Point A |
| 2b | Rx | Tx | S0=S1=OFF | S0=OFF, S1=ON | Bit 1 sent from Point B to Point A |
| 3 | Rx | Tx | S0=S1=OFF | S0=S1=ON | Bits 0 and 1 sent simultaneously from Point B to Point A |

Fig.1(b)

(NX2)-CHANNEL BIT COMMUNICATION SYSTEM

BACKGROUND OF THE INVENTION

1. Field of Technology

The current invention is in the field of digital communications. More specifically, the present invention is a bit communication system with zero Bit Error Rate (BER) over a balanced (N×2)-channel transmission medium.

2. Background of the Invention

In communication systems, Noise is random energy that interfere with the information signal. Noise may be defined as any unwanted introduction of energy tending to interfere with the proper reception and reproduction of transmitted signal. In a fundamental communication system receiver, noise may produce errors at receiver output. Noise may limit the speed and range of communication systems.

Electrical noise in specific; may be any undesirable energy that falls within the passband of the signal. There are two general categories of noise: Correlated Noise—implies relationship between the signal and the noise, exist only when signal is present, and Uncorrelated Noise—present at all time, whether there is a signal or not.

Although not limited to, Correlated Noise may be classified as follows: i) INTERFERENCE: An unwanted energy correlated with the main signal. Interference, at a certain level, will corrupt the information signal. ii) SWITCHING NOISE: Generated by the operation of the very basic electrical, electronic and transmission devices which form a communication system. The on/off switching of communication devices, may introduce correlated noise.

Whereas Uncorrelated Noise may be classified (yet not limited to) as follows:

ATMOSPHERIC NOISE: Caused by lightning discharges in thunderstorms and other natural electric disturbances occurring in the atmosphere, consisting of spurious radio signal with components distributed over a wide range of frequencies. It propagates over the earth in the same way as ordinary radio waves of the same frequencies, and becomes less severe at frequencies above 30 MHz because: The higher frequencies are limited to line-of-sight propagation. Nature of the mechanism generating this noise is such that very little of it is created in the Very High Frequency (VHF) range and above.

EXTRATERRESTRIAL NOISE/SOLAR NOISE: A constant noise radiation from the sun radiates over a very broad frequency spectrum.

COSMIC NOISE: Stars radiate RF noise in the same manner of sun. The noise received is called thermal noise and distributed fairly uniformly over the entire sky.

INDUSTRIAL NOISE: Is between 1 to 600 MHz, the intensity noise made by humans easily outstrips that created by any other source to the receiver (Sources such as automobile, aircraft, electric motors and other heavy machine). The nature of industrial noise is so variable that it is difficult to analyze.

SHOT NOISE: Caused by the random arrival of carriers at the output element of an electronic device. First observed in the anode current of a vacuum-tube amplifier, the current carriers are not moving in continuous steady flow, randomly varying and superimposed onto any signal present. This type of noise is sometimes called transistor noise.

THERMAL NOISE: Is associated with the rapid and random movement of electrons within a conductor due to thermal agitation and present in all electronic component and communications systems, and referred to as white noise, which is a form of additive noise, that cannot be eliminated. It increases in intensity with the number of devices in a circuit.

Thermal noise power is proportional to the product of bandwidth and temperature. Mathematically, noise power is $N=KTB$ $N=$noise power, $K=$Boltzmann's constant ($1.38 \times 10^{-23}$ J/K), B=bandwidth, T=absolute temperature (Kelvin) (17° C. or 290K).

In general, higher data transmission speeds require higher Signal-to-Noise-Ratio (SNR) values at receiver end. Thus, as one major factor, higher data speeds are mainly impeded by higher noise across the communication channel between transmitter and a receiver. For high speed communication, higher modulation schemes are required. Higher modulation schemes require high SNR ratios to function at acceptable levels of Bit Error Rate (BER).

SUMMARY OF THE INVENTION

A bit communication system is presented, wherein:

In one embodiment, a bit communication system for carrying binary information between two ends, over two-channel transmission medium (N×2, N=1), or multiples of a two-channel transmission medium (N×2, N>1), is presented. The presented system consists of two ends (Point A and point B). The two ends may or may not be synchronized. Also, the two ends are connected via two-channel medium (N×2, N=1) or multiples of the same medium (N×2, N>1). Each end is also capable of performing bit transmission, and bit reception according to the bit transmission and reception digital-hardware-implemented mechanisms proposed herein. The two ends are also capable of jointly performing channel balancing over (N×2)-channel. The presented system defines N as a positive integer, wherein N is always greater or equals to one, and in the presentation herein, N is equated to a value of one.

In a fundamental digital communication system, a single-channel transmission medium is sufficient for the transmission and reception of two binary states (0 and 1). The presented system requires at least two-channel transmission medium to reduce the number of binary state representation, per channel in a transmission medium, from two to one. This is achieved by dedicating one of the two-channels for carrying bits representing one binary state, while dedicating the other channel for carrying bits representing the other binary state, thus increasing the tolerance of noise in the transmission medium, resulting in error free bit reception as long as received bit amplitude is higher than noise amplitude (i.e. noise floor) by any margin.

The presented system allows for error free bit transmission (BER=0 at receiving end) as long as bit power is higher in one of the two channels, by any margin, than noise power in the other channel within the same (N×2)-channel transmission medium, provided that the said transmission medium is balanced in terms of signal propagation delay, and attenuation.

In another embodiment, the bit transmission digital-hardware-implemented mechanism of the proposed (N×2)-channel communication system, is presented, wherein at any clock cycle relative to the transmitting end, if an instruction to transmit a bit representing logic "0" is acknowledged, then a pulse of a finite duration will be transmitted through the dedicated channel for logic "0" within the transmission medium, while, during the same clock cycle, nothing will be transmitted through other channel representing logic "1" within the same transmission medium. Whereas, if an instruction to transmit a bit representing logic "1" is acknowledged, then a pulse of a finite duration will be transmitted through the dedicated channel for logic "1" within the transmission medium, meanwhile, during the same clock cycle of the transmitting end, nothing will be transmitted through other channel representing logic "0" within the same transmission medium. The transmitted pulse may be in any form of energy (electrical, photonic, etc.).

In yet another embodiment, the bit reception digital-hardware-implemented mechanism of the proposed (N×2)-channel communication system, is presented, wherein during any clock cycle with respect to the receiving end, the energy at each of the channels, within the (N×2)-channel transmission medium, is sensed, and if the energy value sensed at logic "0" is subtracted from the value sensed at logic "1" channel resulted in a positive value higher than zero or higher than or equal to any predefined positive value, then logic "1" is acknowledged to be received. Else if the energy value sensed at logic "0" is subtracted from the value sensed at logic "1" channel resulted in a negative value lower than zero or lower than or equal to any predefined negative value, then logic "0" is acknowledged to be received. Any other value, with respect to the said subtraction arithmetic, means no acknowledgment of anything being received.

In yet another embodiment, the two-channel balancing digital-hardware-implemented mechanism of the proposed (N×2)-channel communication system, is presented, wherein at a specific recurrent event, with specific duration, relative to transmitting and receiving ends, a parallel-executed instruction to transmit two pulses of a common finite duration, simultaneously through the dedicated channel for logic "0" and the dedicated channel for logic "1" at the same time, within the (N×2)-channel transmission medium, will take place at the same clock cycle, from one specific end towards the other end. Meanwhile during the same specific recurrent event, at the other end (i.e. the receiving end) during any clock cycle, of a specific number of predefined clock cycles with respect to receiving end, the energy at each of the channels, within the (N×2)-channel transmission medium, is sensed and labeled with a time tag, and if the energy value sensed at logic "0" subtracted from the value sensed at logic "1" channel resulted in a positive value higher than zero or higher than or equal to any predefined positive value, then logic "1" channel will be having an added attenuation factor relative to the value of the subtraction process. Else if the energy value sensed at logic "0" subtracted from the value sensed at logic "1" channel resulted in a negative value lower than zero or lower than or equal to any predefined negative value, then logic "0" channel will be having an added attenuation factor relative to the value of the subtraction process. Furthermore if the time tag of the energy value sensed at logic "0" subtracted from the time tag of the value sensed at logic "1" channel resulted in a positive value higher than zero or higher than or equal to any predefined positive value, then logic "1" channel will be having an added delay factor relative to the value of the subtraction process. Else if the time tag of the energy value sensed at logic "0" subtracted from the time tag of the value sensed at logic "1" channel resulted in a negative value lower than zero or lower than or equal to any predefined negative value, then logic "0" channel will be having an added delay factor relative to the value of the subtraction process. The balancing digital-hardware-implemented mechanism ensures that the two channels, within the (N×2)-channel transmission medium, are matched in terms for signal attenuation and propagation delay values. The balancing digital-hardware-implemented mechanism further ensures that proper clocking at the transmitting and receiving ends.

The present invention may be applied on any communication system employing N×2-Channel transmission medium, and architected based on any networking topology (e.g. star, delta, distributed). For example, the present invention may be applied on any wireless or wired communication system employing two-channel transmission medium between a transmitter, and a receiver.

BRIEF DESCRIPTION OF THE DRAWINGS

The appended claims set forth the embodiments of the present invention with particularity. The embodiments of the present invention, together with its advantages, may be best understood from the following detailed description taking into conjunction with the accompanying drawings of which:

FIG. 1(b) Illustrates a table of possible operational switching states at points A and B for transmission, and reception of information bits over (N×2)-channel medium; as well as balancing propagation delay and attenuation over the said medium.

DETAILED DESCRIPTION OF THE INVENTION

Figure 1A:
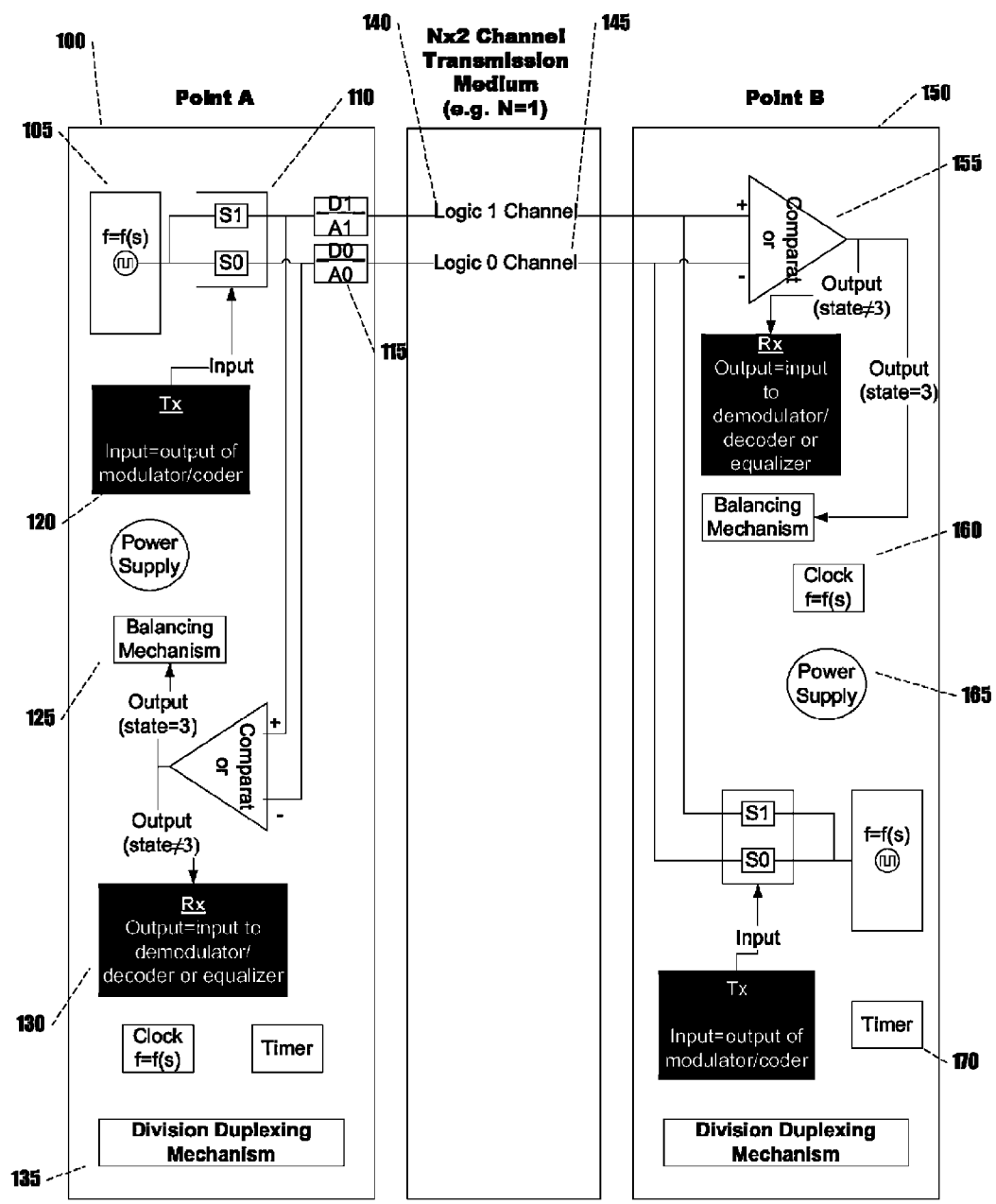
FIG. 1(a) Illustrates a block diagram of an embodiment of an (N×2)-channel bit communication system, where binary information bits are transmitted from Point A, over an (N×2)-channel medium, and properly received at Point B via identifying the route of the pulse.

Described below, is bit communication system using two (or multiples of two) channels as a transmission medium. Throughout the description, for the purpose of explanation, specific details are set forth in order to provide a thorough understanding of the embodiments of the present invention, such that to one ordinary skilled in the art of the present invention, he/she will be able to implement a working model of the system presented herein on digital hardware with appropriate functionality without undue experimentation. In other instances throughout the description, well known structures and devices are generally presented or omitted, to avoid obstructing the underlying principles of the present invention.

In the following description, various specific details are set forth such as logic implementations, types of interrelationships of objects, and logical instructions sets may be set forth in order to provide more thorough understanding of various embodiments of the present invention.

Moreover, to avoid diversification and to further avoid obstructing the underlying principles of the present invention, some fundamental (i.e. known) communication system circuitry or components (e.g. modulators, demodulators, amplifiers, filters, phase recovery components, encoders, decoders, etc.) may not be described or referred-to in this detailed description; and considered to be known communication system design principles with respect to one ordinary skilled in the art of the present invention seeking to implement the presented system on digital hardware.

Embodiments of the present invention will be described below. The embodiments are performed by digital hardware components but may also be embodied in machine-executable instructions, which may be used to cause a general-purpose or specific-purpose machine or logic circuits programmed with the instructions to perform the various embodiments. Alternatively, the various embodiments may be performed by a combination of digital hardware and a set or sets of machine-executable instructions.

In any communication channel, noise (regardless if correlated with main signal or not) is always present, limiting high signal-to-noise ration SNR, hence impeding the use of higher modulation levels for higher data transfer rates.

Disregarding the use of error correction and similar techniques, a communication channel has a basic capacity as per Shannon's Theorem.

Shannon's Theorem, a mathematical model for communication channel capacity, is a function of noise, channel bandwidth and signal power. Channel capacity can be maximized by means of increasing channel bandwidth, and/or increasing signal power, and/or lowering channel noise (possibly coupled with interference). It may be impractical to increase channel bandwidth and/or signal power beyond certain limits, yet it is more practical to decrease channel noise.

There are several known methods to decrease channel noise. However, our invention herein attempts to exclude noise from being a variable; affecting digital communication channel capacity. In other words, noise will not be eliminated; rather, noise effect will be made irrelevant and hence, can be equated to zero.

In fundamental digital communication systems, transmitted information bits representing logic "0" and logic "1" have different signal amplitudes (or amplitude ranges). The introduction of noise may corrupt the said amplitudes; such that the corrupted signal amplitude may be misinterpreted at the receiver, resulting in a different received logic than the one originally transmitted.

The present invention is based on introducing a new concept, where a communication system requires at least two (N×2, N=1, N=integer), or multiples of two (N×2, N>1, N=integer) channel transmission medium to operate, such that a communication signal (e.g. data-carrying electrical, photonic, or other type of energy pulse), is identified by one of the two channels it traveled through. More specifically, in the presented bit communication system, if the pulse power at receiver came through the dedicated channel for sending pulses representing logic "1", then this will be acknowledged as logic "1", otherwise if the sent pulse is received through the dedicated channel for sending pulses representing digit "0", then this will be acknowledged as logic "0". In this way, it can be noted that information is now represented by pulse route with any amplitude above the noise floor. In fact fluctuation in amplitude has no effect as long as there is positive amplitude above noise floor in one of the channels within the (N×2)-channel transmission medium. More specifically, bit error rate (BER) at receiver will have a value of zero as long as SNR>0 dB. This will allow our proposed system to accommodate high level modulation techniques, hence, achieve higher bit transfer rate.

Sent and received pulses may be in the form of electrical charges, light/laser beams, electromagnetic waves, or any other form. However, not to be regarded as a limitation of the present invention but, for the purpose of avoiding unnecessary diversification, the description next will relate to a (N×2, N=1) channel bit communication system transmitting and receiving pulses of electrical energy form; over wired transmission medium.

FIG. 1(a) illustrates a block diagram of an embodiment of an (N×2)-channel bit communication system, where binary information bits are transmitted from Point A, over an (N×2)-channel medium, and properly received at Point B via identifying the route of the pulse. The system consists of at least two ends, each end equipped with identical components compared to the other end. The said components are capable of executing multiple digital-hardware-implemented mechanisms for performing bit transmission, bit reception, and channel balancing functions. On top of known communication system fundamental components (omitted in the description herein), Point A 100, and Point B 150, each include: a pulse generator 105, running at a predefined switching frequency f(s), where at every switching cycle of f(s), the pulse generator 105 (if instructed) generates a pulse, with a predefined bandwidth and centre frequency, and with a pulse rise edge beginning at a predefined value after the beginning of the switching cycle f(s), and a pulse fall edge beginning at the same predefined value before the end of the switching cycle. Furthermore, the time duration, resulting from subtracting the duration of the switching cycle of f(s) from two times the said predefined value, is referred to as the pulse duration (PD). The aim is to have PD value less than the duration of f(s) at all times. The pulse generator in each point feeds two switches 110 (S0 and S1). The switches 110 are operated at the same switching frequency f(s); according to the input from 120. Each switch in 110, when switched on, is used to represent a specific logical state, S0 represents logic "0", and S1 represents logic "1". The said switches 110 are connected to an (N×2) channel transmission medium with N=1 (for the sake of description simplicity, N is equated to 1. However, N is not limited to N=1). More specifically, the (N×2, N=1) channel transmission medium consist of two channels: one dedicated for carrying a signal representing logic "1" 140 (herein after: logic 1 channel), and another channel dedicated for carrying a signal representing logic "0" 145 (herein after: logic 0 channel). The said S1 switch is, in specific, connected to the logic 1 channel; such that whenever logic 1 needs to be represented and transmitted; S1 is switched on and the output pulse of S1 will travel only through the logic 1 channel, hence any pulse amplitude above the noise floor detected at the receiver side on the other point (i.e. the other end) will be acknowledged as bit representing logic 1 being received. Similarly, the other switch, S0, is in specific, connected to the logic 0 channel; such that whenever logic 0 needs to be represented and transmitted; S0 is switched on and the output pulse of S0 will travel only through the logic 0 channel, hence any pulse amplitude above the noise floor detected at the receiver side on the other point (i.e. the other end) will be acknowledged as bit representing logic 0 being received. This arrangement is true on either point: point A, and point B.

Furthermore, each of the two channels pass through an adjustable bidirectional signal delay unit, represented by (but not limited to) a different RC time constant circuitry (serial FIFO buffers with I/O shifting speed=f(s) may also be applied), and also passes through an adjustable gain bidirectional signal amplifier 115. The delay and amplifier units 115 in each channel, when adjusted relative to each other, result in balancing the two channels in terms of signal strength and propagation delay, thus, reducing BER to a minimum, or even zero if channels are perfectly balanced.

Also, each of the points A and B, includes a power supply 165 that feeds the circuitry of points A and B. Furthermore, each of the said points includes a digital clock 160 running at a frequency that is equal to, or multiples of, the switching frequency f(s). However, in the detailed description herein, clock frequency, of either point, equals the switching frequency f(s) (which has, also, the same value at either point). In addition, a timer component 170 is fitted at point A, and point B. The timer component is used to accomplish bit reception and channel balancing digital-hardware-implemented mechanisms that are explained later. Moreover, points A and B each include a signal amplitude comparator 155 with two inputs and one output. One input to 155 is fed by logic 0 channel 145 (−ve input); while the other is fed by logic 1 channel 140 (+ve input). The output of 155 is the arithmetic difference [i.e. output="+ve"+"−ve") of signal amplitude at each input at a given switching cycle. If output from 155 is positive, then this means that a bit carrying logic 1 is received, whereas if output from 155 is negative, then this means that a bit carrying logic 0 is received. The comparator 155 directs its output, depending on comparator state, to either the balancing digital-hardware-implemented mechanism 125 (i.e. state=3); or to further processing 130 (i.e. state≠3). Comparator state is controlled by the balancing digital-hardware-implemented mechanism 125. The balancing digital-hardware-implemented mechanism 125 shall be described in detail later in this detailed description.

Points A and B organize the bit transmission and reception in each of them relative to the other for the purpose of simultaneous two-way communication between A, and B (i.e. channel duplexing), especially in a multi-user system (i.e. division duplexing). In this respect, the proposed invention may use any type of division duplexing 135 (e.g. Frequency Division Duplexing FDD, Time Division Duplexing TDD, Wavelength Division Duplexing WDD, etc.). For the sake of simplicity, FDD is assumed in the presented invention herein.

FIG. 1(*b*) illustrates a table 175, of possible operational switching states at points A and B for transmission, and reception of information bits over (N×2)-channel medium; as well as balancing propagation delay and attenuation over the said medium. The non operational state (i.e. when no switching) is not included in the table of FIG. 1(*b*) since it is irrelevant to the flow of this detailed description. In the proposed system, there are five possible operational switching states: State 1a represents the switching combination at points A, and B for the purpose of logic 0 uplink bit transmission from point A (assuming point A to be the subscriber side) to point B (assuming point B to be the central office/core network side), while State 1b represents the switching combination at points A, and B for the purpose of logic 1 uplink bit transmission from point A to point B. State 2a represents the switching combination at points A, and B for the purpose of logic 0 downlink bit transmission from point B to point A, while State 2b represents the switching combination at points A, and B for the purpose of logic 1 downlink bit transmission from point B to point A.

In the final state mentioned in FIG. 1(*b*), State 3, a switching combination at point A, and B causes parallel downlink bit transmission for logic 1, from point B, to point A. the switching combination of State 3 is essential for the balancing digital-hardware-implemented mechanism (discussed later in this section).

Figure 2:
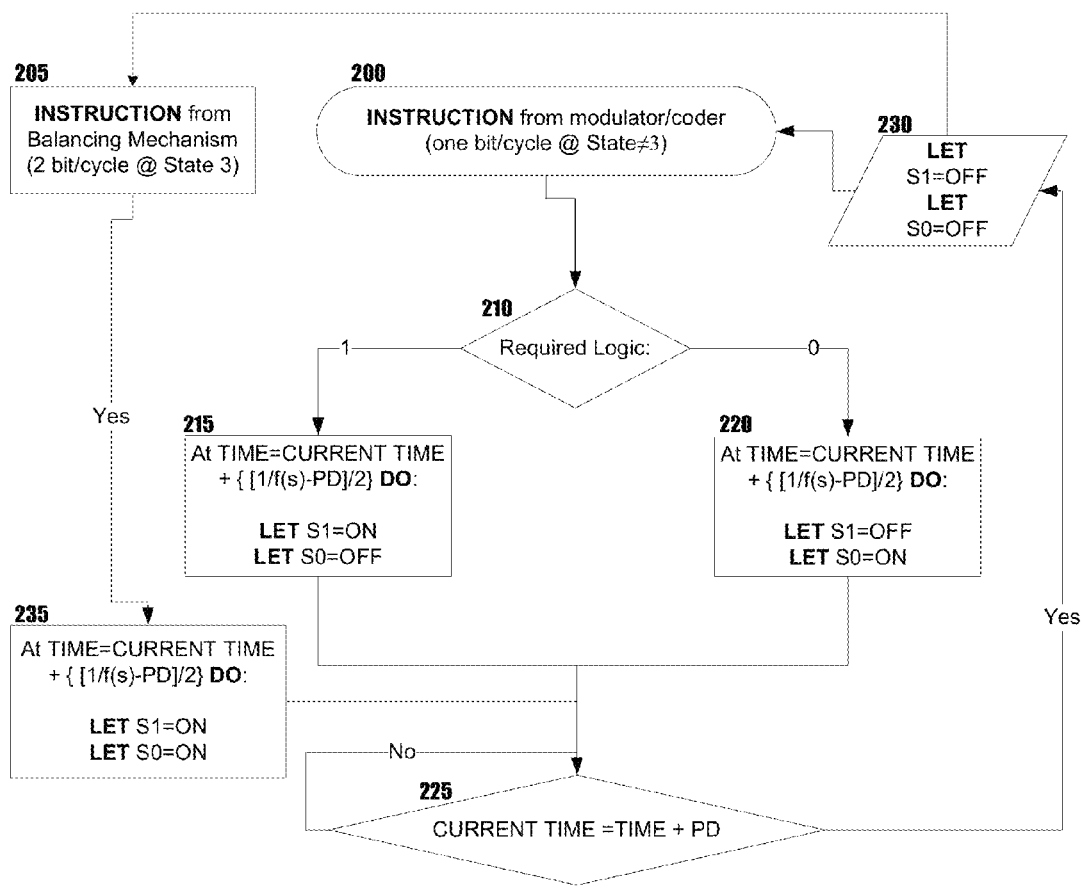
FIG. 2 Illustrates a flow diagram, representing the embodiment of the bit transmission digital-hardware-implemented mechanism of the proposed (N×2)-channel bit communication system.

FIG. 2 illustrates a flow diagram, representing the embodiment of the bit transmission digital-hardware-implemented mechanism of the proposed (N×2)-channel bit communication system. In this embodiment, a description of how each point (i.e. points A and B) of the proposed system, discussed earlier in FIG. 1(*a*) and FIG. 1(*b*), should function in the event of transmitting a bit. The flow diagram illustrated in FIG. 2 describes the bit transmission digital-hardware-implemented mechanism, at each end of the proposed system, in the form of processing blocks, such that: in processing block 200, in any clock cycle, an instruction to transmit a bit, is detected in the form of required switching state≠3. If the said instruction, was found 210, to transmit a bit of logic 0 from one point to another (i.e. State 1a or 2a, depending on point), then processing block 220 will invoke a switching combination which satisfies either State 1a (if at point A), or State 2a (if at point B); at a time value resulting from the arithmetic operation illustrated within the said block. Else, if the instruction from 200, was found 210, to transmit a bit of logic 1 from one point to another (i.e. State 1b or 2b, depending on point), then processing block 215 will invoke a switching combination which satisfies either State 1b (if at point A), or State 2b (if at point B); at a time value resulting from the arithmetic operation illustrated within the said block. In any case, at the end of duration with a time length equals the pulse duration (PD), none of the states will continue to be satisfied 225; due to the inactive switches 230, indicating the end of bit transmission, and being ready to receive the next instruction 200, or 205.

Also in FIG. 2, in the case of a specific instruction 205, in the form of State=3, triggered by the balancing digital-hardware-implemented mechanism (described later) to transmit two parallel logic 1 bit in one clock cycle, from point B to point A, then processing block 235 will invoke a switching combination which satisfies State=3; at a time value resulting from the arithmetic operation illustrated within the said block. In any case, at the end of duration with a time length equals the pulse duration (PD), State=3 will not continue to be satisfied 225; due to the inactive switches 230, indicating the end of parallel two bit transmission, and being ready to receive the next instruction 200, or 205.

Figure 3:
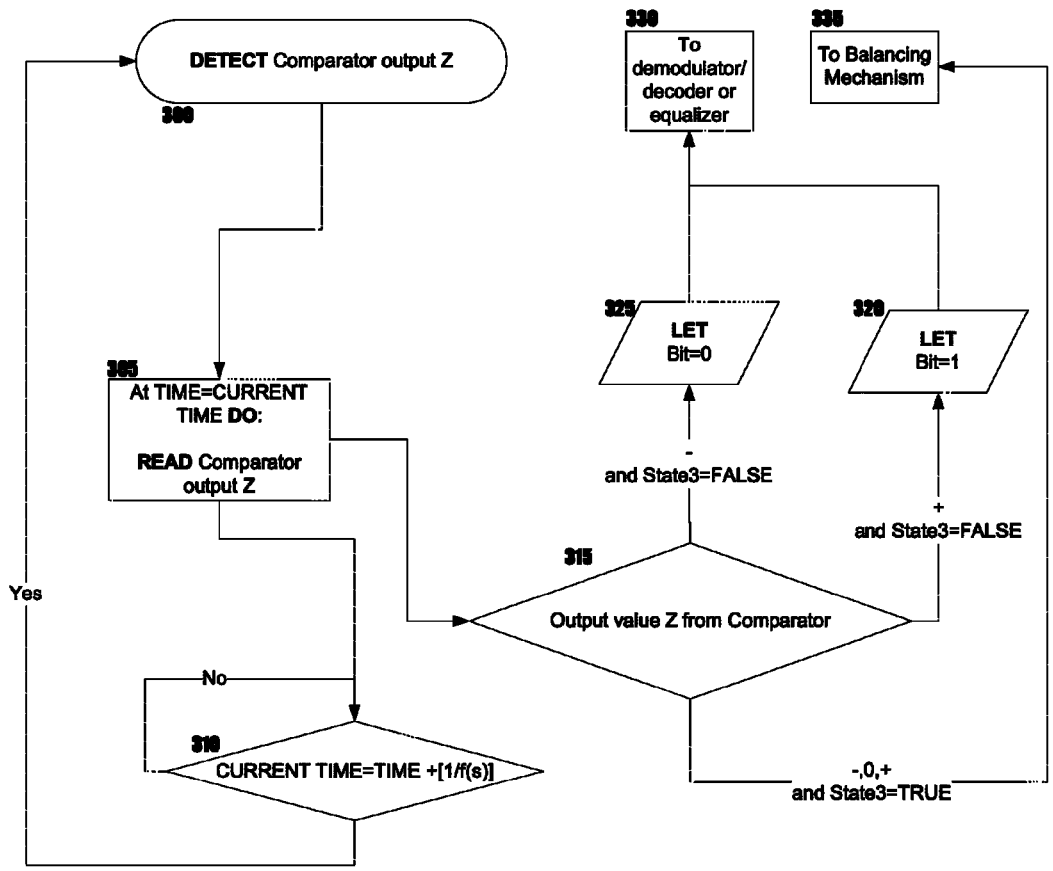
FIG. 3 Illustrates a flow diagram, representing the embodiment of the bit reception digital-hardware-implemented mechanism of the proposed (N×2)-channel bit communication system.

FIG. 3 illustrates a flow diagram, representing the embodiment of the bit reception digital-hardware-implemented mechanism of the proposed (N×2)-channel bit communication system. In this embodiment, a description of how each point (i.e. points A and B) of the proposed system, discussed earlier in FIG. 1(*a*) and FIG. 1(*b*), should function in the event of receiving a transmitted bit. The flow diagram illustrated in FIG. 3 describes the bit reception digital-hardware-implemented mechanism, at each end of the proposed system, in the form of processing blocks, such that: in processing blocks 300 and 305, if at either point (A, or B), during a clock cycle, an output from the comparator (155 in FIG. 1(*a*)) is detected and read as Z. If Z 315 has a negative value while the concerned point (A, or B) is not in state equals State=3, then a bit; representing logic 0 (315), is acknowledged to have been received 330. Else, if Z 315 has a positive value while the concerned point (A, or B) is not in state equals State=3, then a bit; representing logic 1 (320), is acknowledged to have been received (330). Otherwise, if the concerned point (A, or B) is in state equals State=3, then the output value of Z 315 will be used to balance the (N×2, N=1)-channels between points A, and B, according to the balancing digital-hardware-implemented mechanism 335 (described later). Finally, at the end of a clock cycle, and just before the beginning of new clock cycle 310, the next output Z 300 will begin to be under detection for the purpose of repeating the bit reception digital-hardware-implemented mechanism.

Figure 4:
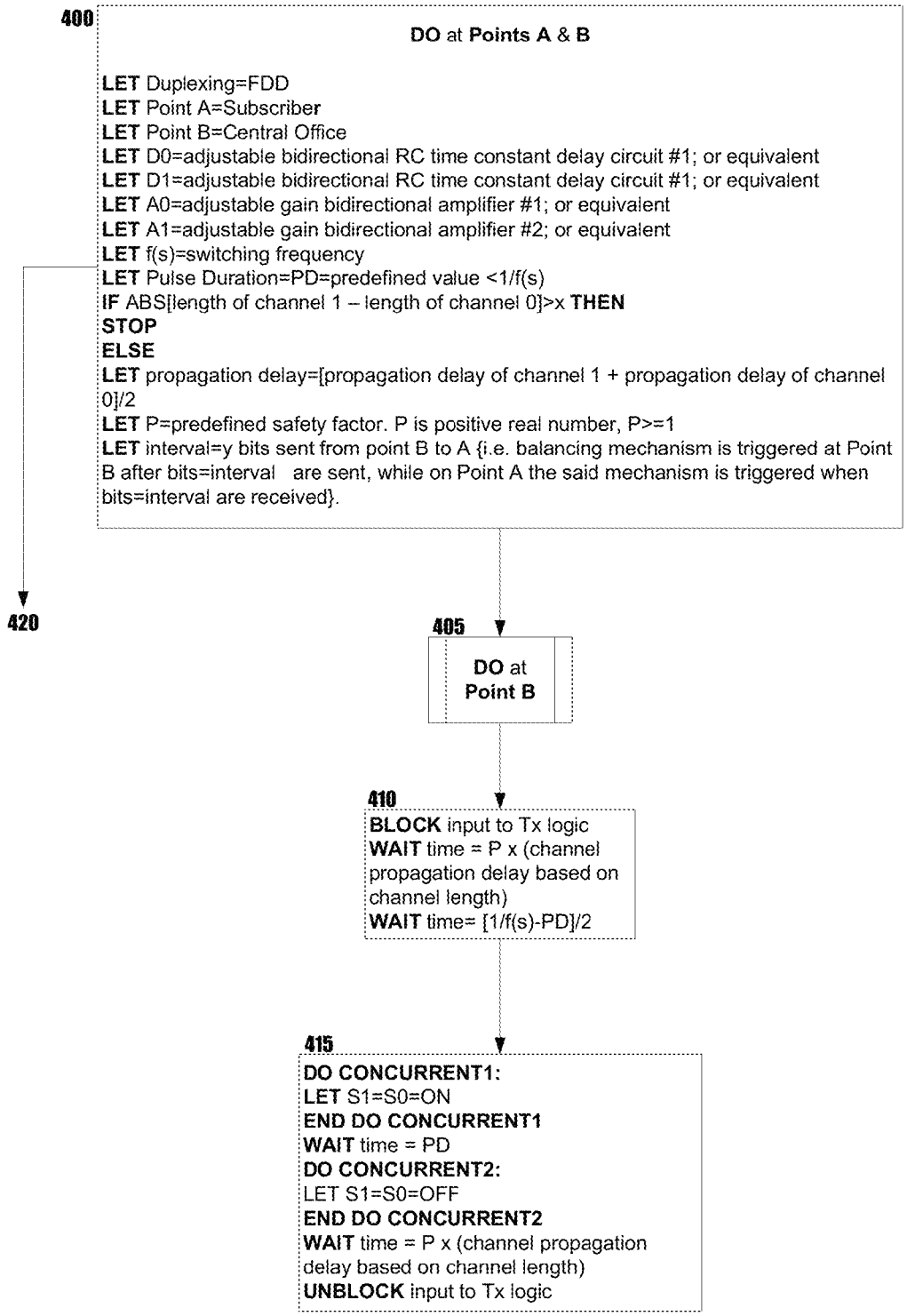
FIG. 4 Illustrates a flow diagram, representing the embodiment of the (N×2)-channel balancing digital-hardware-implemented mechanism of the proposed (N×2)-channel bit communication system.
Figure 4:
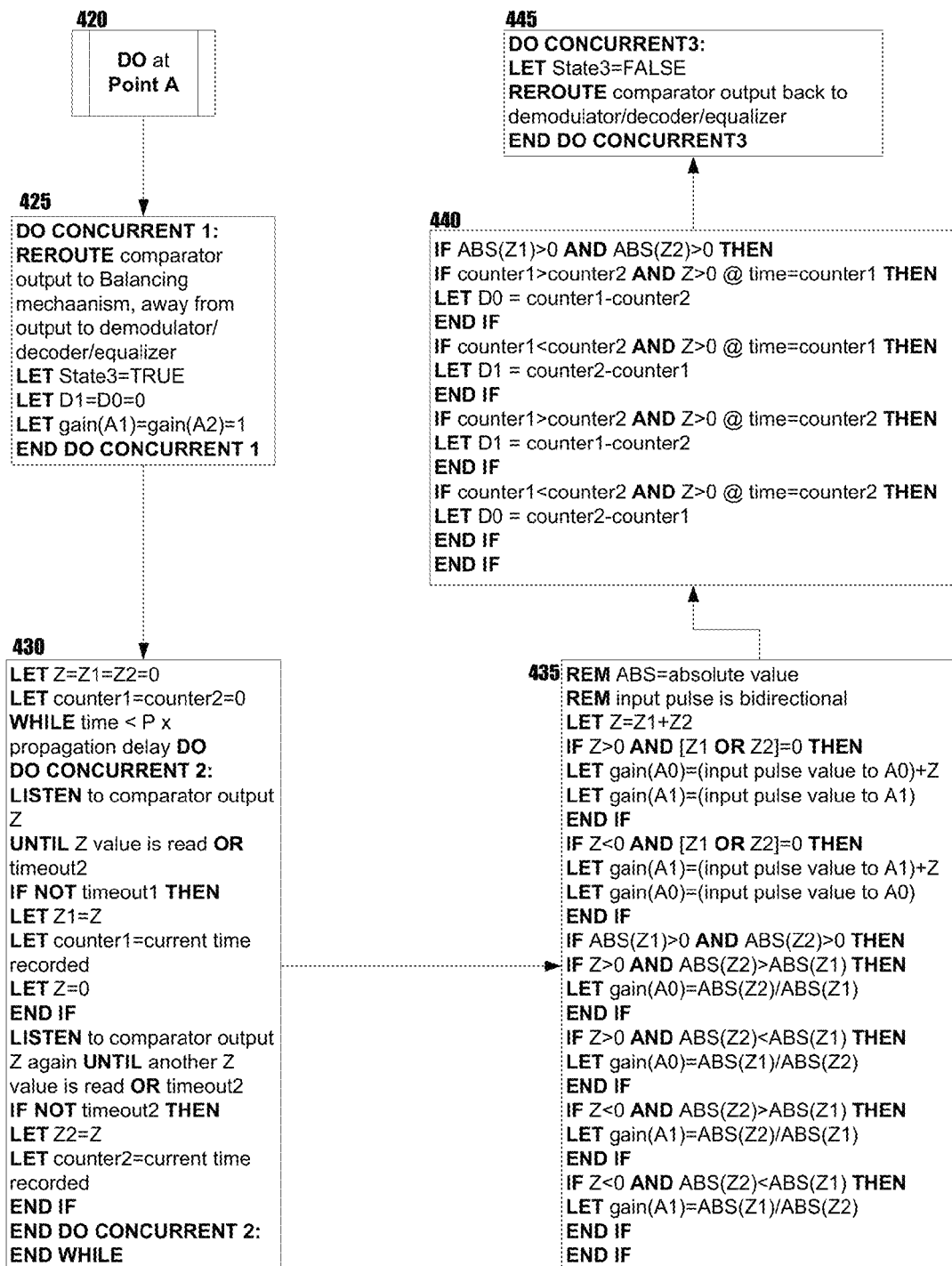

As indicated earlier, the presented system described in FIG. 1(*a*),(*b*), with description of its' transmitting and receiving functionality digital-hardware-implemented mechanisms, as in FIG. 2, and FIG. 3, respectively, assumes that each channel, within the (N×2)-channel medium, is balanced with respect to the other channel, in terms of propagation delay and signal attenuation. Thus, FIG. 4 illustrates a flow diagram; representing the embodiment of the (N×2)-channel balancing digital-hardware-implemented mechanism of the proposed (N×2)-channel bit communication system. In this figure, the flow diagram illustrated describes the channel balancing digital-hardware-implemented mechanism, and the role of point A and point B while the said digital-hardware-implemented mechanism is in effect, in the form of processing blocks, such that: in processing block 400, various definitions, with respect to points A and B and discussed in earlier paragraphs, are made. Following the definitions within the same processing block 400; comes an initial check for the real physical length difference (if any) between the two channels of the (N×2)-channel medium. The difference is represented by the variable x. Furthermore, variable x is assumed to be predefined, and known at each point, prior to the operation of the presented system. Any entered value for x which contradicts the actual value of x in reality; may render the system to malfunction. If the entered value of x is above a certain limit, the proposed system will stop working. If the entered value of x is lower than a certain limit, then the average propagation delay of the two channels, plus a predefined added safety factor, will be assumed. Points A, and B will be in the channel balancing digital-hardware-implemented mechanism mode once in any recurrent stream of y bits (i.e. recurrent specific event).

Processing block 405 in FIG. 4, will only be triggered after the y'th bit is sent by point B. By then, point B will be in a State=3; and point B will only accept input from the balancing digital-hardware-implemented mechanism 410 (i.e. when State=3). Then, at a time equals the (N×2)-channel propagation delay plus a safety factor after processing block 405 is triggered, at the next clock cycle after the above mentioned time, point B will transmit two parallel simultaneous signals to point A 415; as per the bit transmission digital-hardware-implemented mechanism of FIG. 2 while being in State=3. Once the two parallel bits are generated, point B will revert back to a State≠3 at a later time equals the (N×2)-channel propagation delay plus a safety factor.

Whereas the processing block 420 in FIG. 4, will only be triggered after the y'th bit is received by point A. By then, point A will be in a State=3; and point A will send its output to the balancing digital-hardware-implemented mechanism 425 (i.e. when State=3), and all adjustable parameters of the (N×2)-channel medium will be initialized. It should be noted that, if the two parallel signals sent from point B; are received at point A such that the two signals have identical amplitudes and were received at exactly the same time, then the (N×2)-channel medium will be considered as balanced, and subsequent processing blocks (i.e. 430 to 445) will result in no effect at all.

In processing block 430, for a time duration that is less than the (N×2)-channel propagation delay plus a safety factor, each input (i.e. received signal); of the possible two inputs; will have its received amplitude value recorded, as well as the time stamp of arrival. Timeout1 will only be considered to be true if the first input (Z1=Z) is not detected within a time that is less than the (N×2)-channel propagation delay plus a safety factor, otherwise Z1=Z=0. Whereas timeout2 will only be considered to be true if the first input (Z2=Z) is not detected within a time that is less than the (N×2)-channel propagation delay plus a safety factor, otherwise Z2=Z=0. The maximum possible difference in the time stamps of arrival should always be less than of equals the (N×2)-channel propagation delay between points A, and B, assuming identical delay for uplink (point A to point B) and downlink (point B to point A).

It should be noted that, after the execution of block 430, if Z1=0, or Z2=0, then this zero value at the receiving point A; would indicate that at least one component of the parallel single was never transmitted by point B, or a possible break within the transmission medium.

Thereafter at point A, in processing block 435, the adjustable gain value of each of the A0 and A1 bidirectional amplifiers will be automatically adjusted such that the difference between the signal amplitude of logic 0 channel of the (N×2)-channel medium; and the signal amplitude of logic 1 channel of the (N×2)-channel medium, is minimum or zero. If no difference between the said two signal amplitudes, then gain (A0)=gain(A1)=1. The decision process in block 435 totally depends on the values of Z1 and Z2. The main function of processing block 435 is to ensure, via arithmetically obtained values for gain(A0) and gain(A1), that the absolute value of Z1 equals the absolute value of Z2.

Once the balancing digital-hardware-implemented mechanism is past the stage of balancing the amplitudes of the two received signals at point A, processing block 440 of FIG. 4, will check if there are at least two recordings for Z as Z1 then Z2 with two time stamps; that are equal or otherwise (time stamps detected during the execution of processing block 430). If so then the same processing block 440 will use the two time stamps of arrival as well as the values of Z1 and Z2, to decide the required values for the (N×2)-channel medium adjustable delay units: D0, and D1. Else if during the execution of processing block 440, the two time stamps were found to have the same time value, then D0, and D1 will impose no further delay such that both having a common value of zero. Furthermore, it can be noted that, within the processing block 440, the value of Z is still Z=Z1+Z2 which was defined in processing block 435, and the value of Z in this processing block is relative to a specific time stamp (recorded on counter1 and counter2, represented in the timer component of FIG. 1(*a*)). The time dependent values of Z (=Z1+Z2 at a certain time stamp); plus the difference between the values of the time stamps of arrival (i.e. the difference between the recorded values of counter1 and counter2), are the factors which governs the decision flow within processing block 440. Once processing block 440 is executed, point A will switch back to a State≠3 immediately 445.

The balancing digital-hardware-implemented mechanism described above repeats at a cycle rate equals y bits.

Lastly, it should be appreciated that reference throughout this specification to "the embodiment", or "an embodiment", or "one embodiment", or "another embodiment" means that a particular feature, structure or characteristic described in the connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description, with each claim standing on its own as a separate embodiment of the invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

The invention claimed is:

1. A Method for bit communication with no error for transferring communication signals between transmitting and receiving ends through a transmission medium of two identical channels at any signal to noise ratio greater than zero decibel; wherein the method comprising:
dedicating one of the two channels for carrying bits representing one binary state of logic "1", while dedicating the other channel for carrying bits representing the other binary state of logic "0";
sending signals as pulses through channels from the transmitting end to the receiving end;
wherein if the pulse power at said receiving end came through the dedicated channel for sending pulses representing logic "1", an acknowledged as logic "1" being received;
wherein if the sent pulse is received through the dedicated channel for sending pulses representing logic "0", an acknowledged as logic "0" being received.

2. The method for bit communication according to claim 1, wherein the transmitting and receiving ends are synchronized, and connected via multiples of two channels transmission medium.

3. The method for bit communication according to claim 1, wherein the two channels of the transmission medium are wireless.

4. The method for bit communication according to claim 1, wherein:
at any clock cycle relative to the transmitting end, if an instruction to transmit a bit representing logic "0" is acknowledged, then a pulse of a finite duration will be transmitted through the dedicated channel for logic "0" within the transmission medium, while, during the same clock cycle, nothing will be transmitted through other channel representing logic "1" within the same transmission medium;
wherein if an instruction to transmit a bit representing logic "1" is acknowledged, then a pulse of a finite duration will be transmitted through the dedicated channel for logic "1" within the transmission medium, meanwhile, during the same clock cycle of the transmitting end, nothing will be transmitted through other channel representing logic "0" within the same transmission medium.

5. The method for bit communication according to claim 1, wherein:
during any clock cycle with respect to the receiving end, the energy at each of the channels is sensed, and if the energy value sensed at the channel representing logic "0" subtracted from the energy value sensed at the channel representing logic "1" resulted in a positive value higher than zero or higher than or equal to any predefined positive value, then logic "1" is received;
wherein if the energy value sensed at the channel representing logic "0" subtracted from the value sensed at the channel representing logic "1" resulted in a negative value lower than zero or lower than or equal to any predefined negative value, then logic "0" is received. Any other value, with respect to the said subtraction logic, means no acknowledgment of anything being received.

6. The method for bit communication according to claim 1, wherein:
at a specific recurrent event, with specific duration, relative to transmitting and receiving ends, a parallel-executed instruction to transmit two pulses of a common identical finite duration, simultaneously through the dedicated channel for logic "0" and the dedicated channel for logic "1" at the same time, within the channel transmission medium, will take place at the same clock cycle, from one specific end towards the other end, meanwhile, during the same specific recurrent event, at the other end during any clock cycle, of a specific number of predefined clock cycles with respect to receiving end, the energy at each of the channels, within the channel transmission medium, is sensed and labelled with a time tag;
wherein if the energy value sensed at the dedicated channel for logic "0" subtracted from the value sensed at the dedicated channel for logic "1" resulted in a positive value higher than zero or higher than or equal to any predefined positive value, then logic "1" dedicated channel will be having an added attenuation factor relative to the value of the subtraction process;
wherein if the energy value sensed at dedicated channel for logic "0" subtracted from the value sensed at the dedicated channel for logic "1" resulted in a negative value lower than zero or lower than or equal to any predefined negative value, then logic "0" channel will be having an added attenuation factor relative to the value of the subtraction process;
wherein if the time tag of the energy value sensed at logic "0" dedicated channel subtracted from the time tag of the energy value sensed at logic "1" dedicated channel resulted in a positive value higher than zero or higher than or equal to any predefined positive value, then logic "1" dedicated channel will be having an added delay factor relative to the value of the subtraction process;
wherein if the time tag of the energy value sensed at logic "0" dedicated channel subtracted from the time tag of the energy value sensed at logic "1" dedicated channel resulted in a negative value lower than zero or lower than or equal to any predefined negative value, then logic "0" dedicated channel will be having an added delay factor relative to the value of the subtraction process.

7. The method for bit communication according to claim 1, wherein the two transmitting and receiving ends are not synchronized, and connected via multiples of two channels transmission medium.

8. The method for bit communication according to claim 1, wherein the two channels of the transmission medium are wired channels.

9. A Bit communication system with no error for transferring communication signals at any signal to noise ratio greater than zero decibel; said bit communication system comprising:
transmitting and receiving ends,
a transmission medium consisting of at least two channels one dedicated for carrying a signal representing logic "1" and the other channel dedicated for carrying a signal representing logic "0";
a pulse generator, running at a predefined switching frequency f(s), where at every switching cycle of f(s), the pulse generator generates a pulse, with a predefined bandwidth and center frequency, and with a pulse rise edge beginning at a predefined value after the beginning of the switching cycle f(s), and a pulse fall edge beginning at the same predefined value before the end of the switching cycle wherein the time duration, resulting from subtracting the duration of the switching cycle of f(s) from two times the said predefined value, is referred to as the pulse duration (PD);

wherein the pulse generator in each end feeds two switches (S0 and S1) used to represent a specific logical state, S0 represents logic "0", and S1 represents logic "1" wherein the two switches operated at the same switching frequency f(s) according to the input from modulator;

wherein the S1 switch is connected to the logic 1 channel, such that whenever logic 1 needs to be represented and transmitted, S1 switch is switched on and the output pulse of S1 switch will travel only through the logic 1 channel, hence any pulse amplitude above the noise floor detected at the receiver side on the other end will be acknowledged as bit representing logic 1 being received;

wherein the other switch S0 is connected to the logic 0 channel, such that whenever logic 0 needs to be represented and transmitted, S0 switch is switched on and the output pulse of S0 switch will travel only through the logic 0 channel, hence any pulse amplitude above the noise floor detected at the receiver side on the other end) will be acknowledged as bit representing logic 0 being received;

a power supply at each end that feeds the circuitry of two ends; and a digital clock at each end running at a frequency that is equal to, or multiples of, the switching frequency f(s).

10. The bit communication system according to claim 9, further comprising a timer component for accomplish bit reception and channel balancing.

11. The bit communication system according to claim 9, further comprising a signal amplitude comparator with two inputs and one output wherein one input to is fed by logic 0 channel; while the other input is fed by logic 1 channel.

12. The bit communication system according to claim 9, further comprising an adjustable bidirectional signal delay unit and an adjustable gain bidirectional signal amplifier for balancing the two channels in terms of signal strength and propagation delay.

* * * * *